US 12,308,761 B2

(12) United States Patent
Kawai et al.

(10) Patent No.: US 12,308,761 B2
(45) Date of Patent: May 20, 2025

(54) PARALLEL CONVERSION UNITS WITHOUT AN OUTPUT BALANCING CIRCUIT

(71) Applicant: Mitsubishi Electric Corporation, Tokyo (JP)

(72) Inventors: Yu Kawai, Tokyo (JP); Yuki Itogawa, Tokyo (JP); Takeshi Amimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 230 days.

(21) Appl. No.: 17/796,676

(22) PCT Filed: Apr. 20, 2020

(86) PCT No.: PCT/JP2020/017076
§ 371 (c)(1),
(2) Date: Aug. 1, 2022

(87) PCT Pub. No.: WO2021/214835
PCT Pub. Date: Oct. 28, 2021

(65) Prior Publication Data
US 2023/0058644 A1  Feb. 23, 2023

(51) Int. Cl.
*H02M 7/487* (2007.01)
*H02M 1/00* (2006.01)
*H02M 3/335* (2006.01)

(52) U.S. Cl.
CPC .......... *H02M 7/487* (2013.01); *H02M 1/007* (2021.05); *H02M 1/0077* (2021.05); *H02M 3/33573* (2021.05); *H02M 3/33592* (2013.01)

(58) Field of Classification Search
CPC ....................................... H02M 1/0067–0077
See application file for complete search history.

(56) References Cited

U.S. PATENT DOCUMENTS 10,615,715 B2   4/2020 Norimatsu et al.
10,848,066 B1*  11/2020 Yan .................. H02M 1/096
(Continued)

FOREIGN PATENT DOCUMENTS

EP   3109992 A1   12/2016
EP   3553934 A1   10/2019
(Continued)

OTHER PUBLICATIONS

Machien translation of WO 2019162608 (Year: 2019).*
(Continued)

*Primary Examiner* — Peter M Novak
(74) *Attorney, Agent, or Firm* — XSENSUS LLP

(57) ABSTRACT

A first capacitor and a second capacitor are connected in series through a neutral point on the DC side of an inverter. A first converter receives an input voltage from a power source and outputs a first DC voltage to the first capacitor. A second converter receives a common input voltage and outputs a second DC voltage to the second capacitor. A control circuit controls the first converter such that the first DC voltage is controlled in accordance with a preset first voltage command value and controls the second converter such that the second DC voltage is controlled in accordance with a second voltage command value set equivalent to the first voltage command value.

10 Claims, 9 Drawing Sheets

(56) References Cited

U.S. PATENT DOCUMENTS

| | | | |
|---|---|---|---|
| 2013/0057200 A1* | 3/2013 | Potts | H02J 50/12 |
| | | | 320/107 |
| 2014/0307481 A1 | 10/2014 | Wang et al. | |
| 2019/0058409 A1* | 2/2019 | Ishibashi | H02J 3/36 |
| 2020/0067423 A1 | 2/2020 | Maksimovic et al. | |

FOREIGN PATENT DOCUMENTS

| | | | | |
|---|---|---|---|---|
| JP | 2001-54284 A | 2/2001 | | |
| JP | 3186369 B2 | 7/2001 | | |
| JP | 6087531 B2 | 3/2017 | | |
| JP | 2018-98834 A | 6/2018 | | |
| WO | WO-2019162608 A1 * | 8/2019 | | B60L 15/007 |

OTHER PUBLICATIONS

Extended European Search Report issued Apr. 24, 2023 in European Patent Application No. 20932803.8, 7 pages.
International Search Report and Written Opinion mailed on Jul. 21, 2020, received for PCT Application PCT/JP2020/017076, filed on Apr. 20, 2020, 8 pages including English Translation.
Office Action issued Jun. 18, 2024 in corresponding European Patent Application No. 20 932 803.8.
Hou Nie et al.; "A Tunable Power Sharing Control Scheme for the Output-Series DAB DC-DC System With Independent or Common Input Terminals", IEEE Transactions on Power Electronics, Oct. 1, 2019, pp. 9386-9391, vol. 34, No. 10, Institute of Electrical and Electronics Engineers, USA, XP011733551.

* cited by examiner

PARALLEL CONVERSION UNITS WITHOUT AN OUTPUT BALANCING CIRCUIT

CROSS-REFERENCE TO RELATED APPLICATION

The present application is based on PCT filing PCT/JP2020/017076, filed Apr. 20, 2020, the entire contents of which is incorporated herein by reference.

TECHNICAL FIELD

The present disclosure relates to a power conversion device.

BACKGROUND ART

In a power conversion device, a configuration having an inverter with the DC side divided into two is sometimes used. In such a configuration, on the DC side of the inverter, capacitors are connected in series between positive and negative DC bus voltages in the power conversion device, and a grounded potential is applied to a neutral point of these capacitors.

In the above configuration, the voltages of the capacitors divided at the neutral point become unbalanced due to the influence of the AC side of the inverter (for example, voltage harmonics distortion of a power system), and this unbalance needs to be eliminated.

For example, Japanese Patent No. 6087531 (PTL 1) discloses a configuration including a DC-DC converter to control the entire DC voltage (that is, DC bus voltage) of a positive bus capacitor and a negative bus capacitor connected in series and additionally including a balance circuit for eliminating a voltage difference between the positive bus capacitor and the negative bus capacitor.

CITATION LIST

Patent Literature

PTL 1: Japanese Patent No. 6087531

SUMMARY OF INVENTION

Technical Problem

Unfortunately, in the configuration in PTL 1, the DC-DC converter and the balance circuit need to be operated in a cooperative manner, which may lead to complication of control. For example, if the responsiveness of control on the DC bus voltage and the responsiveness of voltage control by the balance circuit are equivalent, they may interfere with each other to cause fluctuations of voltage on the DC side of the inverter and thereby influence the AC side of the inverter. When these control interference is alleviated by making the responsiveness of control of the DC bus voltage higher than the responsiveness of voltage control by the balance circuit, too slow convergence in voltage unbalance between the positive bus capacitor and the negative bus capacitor may influence the AC side of the inverter. Conversely, when these control interference is alleviated by making the responsiveness of control of the DC bus voltage lower than the responsiveness of voltage control by the balance circuit, too slow absorption of voltage fluctuations on the DC bus at a time of output power sudden change of the inverter may influence the AC side of the inverter. In this way, the use of a balance circuit may require minute adjustment so as not to influence the AC side of the inverter.

Moreover, in the control operation of the balance circuit in PTL 1, since one (high voltage side) of the positive bus capacitor and the negative bus capacitor charges the other (low voltage side), power loss in the balance circuit may reduce the efficiency of the entire power conversion device.

The present disclosure is made to solve such a problem, and an object of the present disclosure is to provide a circuit configuration capable of suppressing voltage unbalance between capacitors without incurring complication of control or reduction in efficiency in a power conversion device in which the DC side of an inverter is divided into two by capacitors.

Solution to Problem

According to an aspect of the present disclosure, a power conversion device includes a first capacitor and a second capacitor connected in series, a first converter, a second converter, an inverter having a DC side and an AC side, and a control circuit to control operation of the first converter and the second converter. The first converter receives an input voltage from a power source and outputs a first DC voltage to the first capacitor. The second converter receives an input voltage common to the first converter and outputs a second DC voltage to the second capacitor. The DC side of the inverter is connected to the first capacitor and the second capacitor. The inverter generates an AC voltage on the AC side, using the first DC voltage and the second DC voltage on the DC side. The control circuit controls the first converter such that the first DC voltage is controlled in accordance with a preset first voltage command value and controls the second converter such that the second DC voltage is controlled in accordance with a second voltage command value set equivalent to the first voltage command value.

Advantageous Effects of Invention

According to the present disclosure, in a power conversion device having a configuration in which the DC side of an inverter is divided into two by a first converter and a second converter, the first DC voltage of the first capacitor and the second DC voltage of the second capacitor are individually controlled by the first converter and the second converter, whereby voltage unbalance between the first and second capacitors can be suppressed without incurring complication of control and reduction of efficiency.

DESCRIPTION OF EMBODIMENTS

Figure 1:
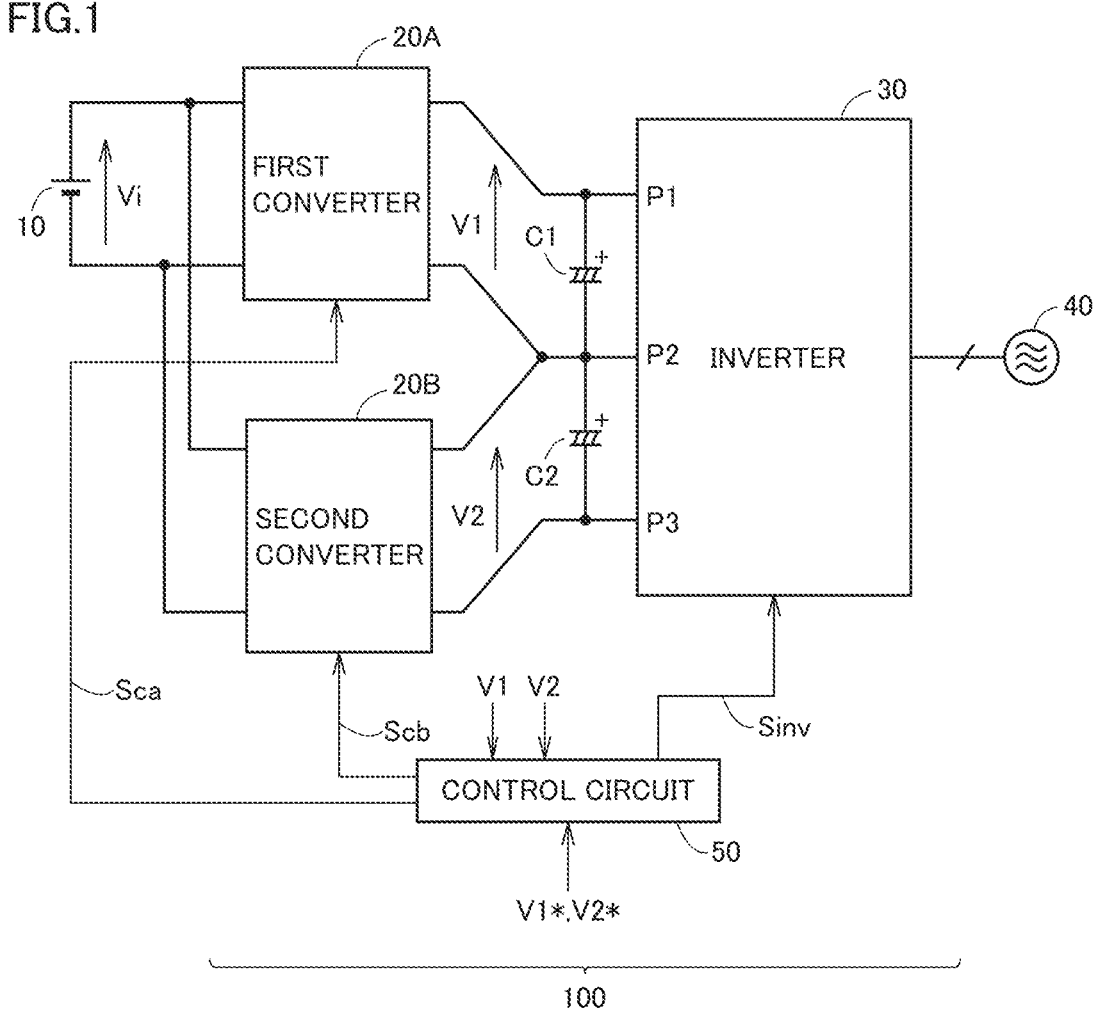
FIG. 1 is a block diagram illustrating the entire configuration of a power conversion device according to the present embodiment.

Embodiments of the present disclosure will be described in detail below with reference to the drawings. In the following, like or corresponding parts in the drawings are denoted by like reference signs and a description thereof is basically not repeated.

First Embodiment

FIG. 1 is a block diagram illustrating the entire configuration of a power conversion device according to the present embodiment.

Referring to FIG. 1, a power conversion device 100 according to the present embodiment includes a first converter 20A, a second converter 20B, a first capacitor C1, a second capacitor C2, and an inverter 30. Power conversion device 100 performs power conversion between a DC power source 10 and a power system 40.

DC power source 10 outputs a power supply voltage Vi. DC power source 10 is composed of, for example, solar cells, fuel cells, a stationary power storage device, or a vehicle-mounted power storage device. Power system 40 can be composed of, for example, a single-phase AC or three-phase AC commercial system.

For example, power conversion device 100 converts DC power from DC power source 10 into AC power to interconnect to power system 40. Alternatively, conversely, power conversion device 100 may convert AC power from power system 40 into charging power for DC power source 10.

First converter 20A performs DC/DC conversion between DC power source 10 and first capacitor C1. Similarly, second converter 20B performs DC/DC conversion between DC power source 10 and second capacitor C2.

Specifically, first converter 20A receives power supply voltage Vi from DC power source 10 and outputs a first DC voltage V1. As described later, first converter 20A includes a plurality of semiconductor switching elements (hereinafter simply referred to as switching elements) on/off-controlled in accordance with a control signal from a control circuit 50.

Similarly, second converter 20B receives power supply voltage Vi common to first converter 20A and outputs a second DC voltage V2. As described later, first converter 20A includes a plurality of switching elements on/off-controlled in accordance with a control signal from control circuit 50. That is, power supply voltage Vi of DC power source 10 corresponds to "input voltage" common to first converter 20A and second converter 20B.

Each of first converter 20A and second converter 20B has the switching elements on/off-controlled in accordance with a control signal from control circuit 50 to perform DC/DC conversion.

First capacitor C1 and second capacitor C2 are connected in series to the DC side of inverter 30 that performs DC/AC conversion. A first terminal P1, a second terminal P2, and a third terminal P3 are provided on the DC side of inverter 30. The AC side of inverter 30 is connected to power system 40.

The high voltage side and the low voltage side of first capacitor C1 are respectively connected to first terminal P1 and second terminal P2. The high voltage side and the low voltage side of second capacitor C2 are respectively connected to second terminal P2 and third terminal P3. The second terminal corresponds to a neutral point of first capacitor C1 and second capacitor C2 connected in series.

First DC voltage V1 from first converter 20A is applied to first capacitor C1. Similarly, second DC voltage V2 from second converter 20B is applied to second capacitor C2.

Inverter 30 converts first DC voltage V1 between first terminal P1 and second terminal P2 and second DC voltage V2 between first terminal P1 and second terminal P2 into an AC voltage to be applied to power system 40.

The voltage unbalance between first capacitor C1 and second capacitor C2 will now be described.

When first converter 20A and second converter 20B supply equivalent powers, unbalance (voltage unbalance) may occur between first DC voltage V1 of first capacitor C1 and second DC voltage V2 of second capacitor C2 due to manufacturing variation in capacitance of first capacitor C1 and second capacitor C2. Alternatively, when operation occurs such that current at first terminal P1 and current at third terminal P3 do not match in inverter 30, voltage unbalance occurs similarly between first capacitor C1 and second capacitor C2.

When the voltage unbalance occurring for the reasons described above continuously increases, restrictions are imposed on a voltage that can be output to the AC side of inverter 30 and, ultimately, system interconnection may fail.

In power conversion device 100 according to the present embodiment, first DC voltage V1 and second DC voltage V2 are individually controlled by first converter 20A and second converter 20B to suppress the voltage unbalance without providing a balance circuit as in PTL 1.

Control circuit 50 controls the operation (power conversion) of first converter 20A and second converter 20B, based on detection values of first DC voltage V1 and second DC voltage from a not-illustrated voltage sensor. Specifically, control circuit 50 generates a control signal Sca of first converter 20A and a control signal Sca of second converter 20B. Further, control circuit 50 generates a control signal Sinv to control the operation of inverter 30.

First converter 20A has the switching elements on/off-controlled in accordance with control signal Sca from control circuit 50 to adjust input/output power of DC power source 10 such that first DC voltage V1 is maintained at a first voltage command value V1*. That is, power transmitted from first converter 20A to inverter 30 (first terminal P1 and second terminal P2) is adjusted whereby first DC voltage V1 of first capacitor C1 is controlled to first voltage command value V1*.

Similarly, second converter 20B has the switching elements on/off-controlled in accordance with control signal Scb from control circuit 50 to adjust input/output power of DC power source 10 such that second DC voltage V2 is maintained at a second voltage command value V2*. That is, power transmitted from second converter 20B to inverter 30 (second terminal P2 and third terminal P3) is adjusted whereby second DC voltage V2 of second capacitor C2 is controlled to second voltage command value V2*.

First voltage command value V1* and second voltage command value V2* are set to the same value, whereby first DC voltage V1 and second DC voltage V2 can be controlled to the same voltage value under the control of first converter 20A and second converter 20B even when the capacitance difference between capacitors or the current mismatch in inverter 30 described above occurs. Thus, even when there is a capacitance difference between first capacitor C1 and second capacitor C2, voltage unbalance can be suppressed.

When there is a difference between power extracted from first capacitor C1 and power extracted from second capacitor C2 in inverter 30, the voltage unbalance described above may also occur between first capacitor C1 and second capacitor C2.

In this respect, in power conversion device 100 according to the present embodiment, first DC voltage V1 and second DC voltage V2 are respectively controlled by first converter 20A and second converter 20B in accordance with first voltage command value V1* and second voltage command value V2* set to the same value. Accordingly, even when the power requested by inverter 30 is disproportionate to one of first capacitor C1 and second capacitor C2, first converter 20A and second converter 20B control first DC voltage V1 and second DC voltage V2 in accordance with first voltage command value V1* and second voltage command value V2* to simultaneously adjust the power output from DC power source 10 to power system 40.

Figure 2:
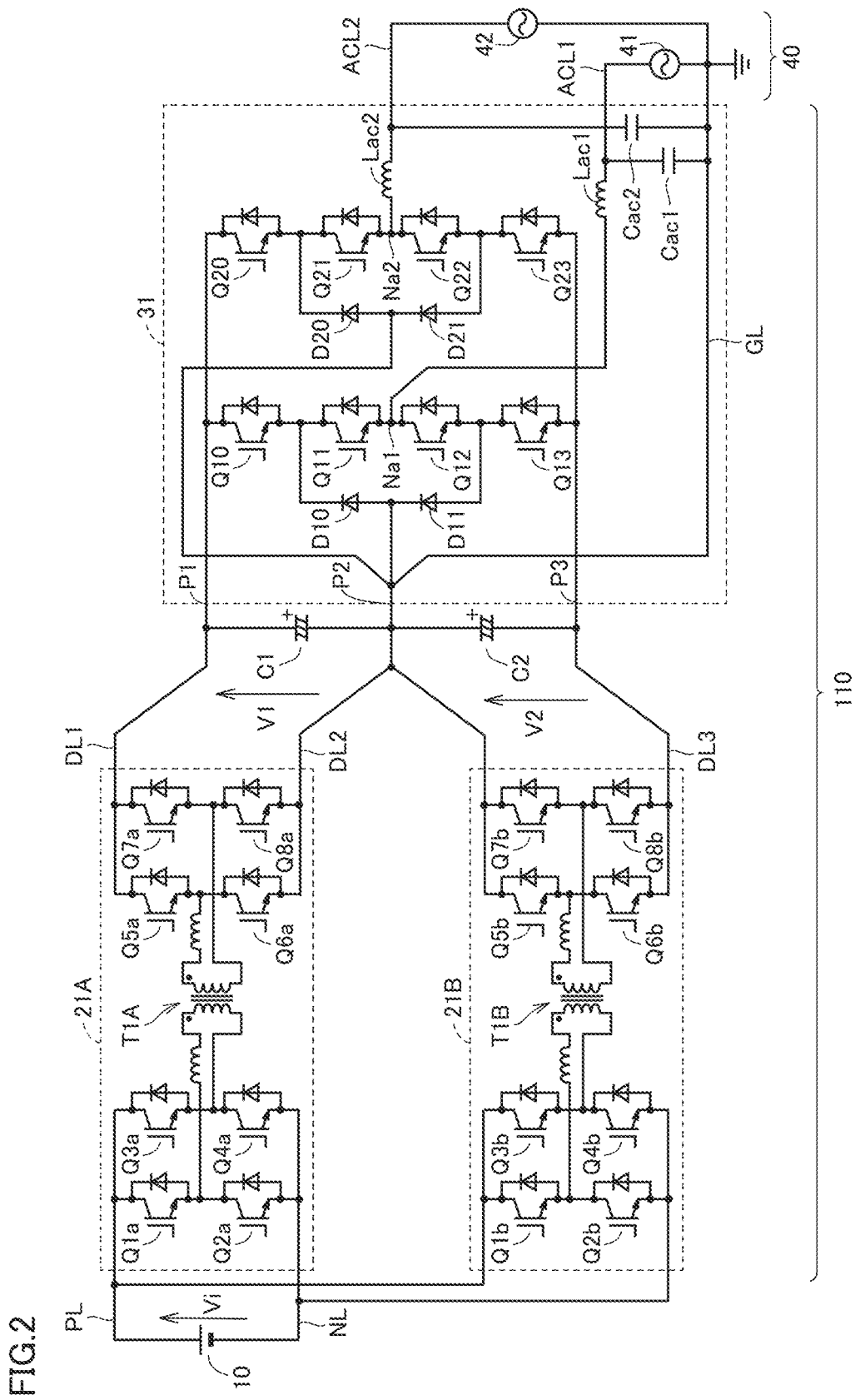
FIG. 2 is a circuit diagram illustrating a configuration of a power conversion device according to a first example of a first embodiment.

A specific example of first converter 20A, second converter 20B, inverter 30, and power system 40 illustrated in FIG. 1 will now be described with reference to FIG. 2 to FIG. 7. In FIG. 2 and subsequent drawings, notation of control circuit 50 and control signals Sca, Scb, and Sinv from control circuit 50 will be omitted, but the power conversion in the converters and the inverter is controlled by these control signals from control circuit 50 as in FIG. 1.

FIG. 2 is a circuit diagram illustrating a configuration of a power conversion device 110 according to a first example of the first embodiment.

Referring to FIG. 2, a first converter 21A and a second converter 21B correspond to an example of first converter 20A and second converter 20B in FIG. 1. Similarly, an inverter 31 corresponds to an example of inverter 30 in FIG. 1.

First converter 21A has a circuit configuration of dual active bridge (DAB) and includes switching elements Q1a to Q4a to constitute a first bridge, a transformer T1A, and switching elements Q5a to Q8a to constitute a second bridge. Any switching elements capable of on/off control by a control signal from control circuit 50, such as insulated gate bipolar transistors (IGBTs) or metal oxide semiconductor field effect transistors (MOSFETs), can be used as switching elements Q1a to Q8a. Other switching elements described in the present embodiment may also be configured in the same manner as switching elements Q1a to Q8a.

The on/off of switching elements Q1a to Q4a constituting the first bridge is controlled in accordance with a control signal from control circuit 50 (FIG. 1). The first bridge is connected between DC power source 10 and the primary winding of transformer T1A. For example, in the first bridge, a pair of switching elements Q1a and Q4a and a pair of switching elements Q2a and Q3a are alternately turned on and off so that the first bridge can convert power supply voltage Vi between DC buses PL and NL into an AC voltage and output the AC voltage to the primary winding of transformer T1A.

The on/off of switching elements Q5a to Q8a constituting the second bridge is controlled in accordance with a control signal from control circuit 50 (FIG. 1). The second bridge is connected between the primary winding of transformer T1A and power lines DL1, DL2. For example, in the second bridge, a pair of switching elements Q5a and Q8a and a pair of switching elements Q6a and Q7a are alternately turned on and off so that the second bridge can convert an AC voltage transmitted to the secondary winding of transformer T1A into a DC voltage between power lines DL1 and DL2.

Power line DL1 is connected to the high voltage side of first capacitor C1, and power line DL2 is connected to the low voltage side of first capacitor C1. Thus, first converter 21A electrically insulates DC power source 10 from first capacitor C1 and performs DC/DC conversion of power supply voltage Vi and first DC voltage V1.

For example, a phase difference is provided between the on/off control signal in the first bridge and the on/off control signal in the second bridge (typically, between switching elements Q1a and Q5a) and the phase difference is changed, whereby the power transmitted from first converter 21A to inverter 30 can be bidirectionally adjusted. Control circuit 50 (FIG. 1) therefore can generate control signal Sca (FIG. 1) of switching elements Q1a to Q8a such that the phase difference is adjusted based on the difference between a detection value of first DC voltage V1 and first voltage command value V1*.

Second converter 21B has a DAB circuit configuration similar to that of first converter 21A and includes switching elements Q1b to Q4b to constitute a first bridge, a transformer T1B, and switching elements Q5b to Q8b to constitute a second bridge. Second converter 21B is controlled by control circuit 50 in the same manner as first converter 21A.

Thus, the first bridge can convert power supply voltage Vi between DC buses PL and NL into an AC voltage of the primary winding of transformer T1B. The second bridge can convert an AC voltage transmitted to the secondary winding of transformer T1A into a DC voltage between power lines DL2 and DL3. Power line DL2 is connected to the high voltage side of second capacitor C2, and power line DL3 is connected to the low voltage side of second capacitor C2. As a result, second converter 21B electrically insulates DC power source 10 from second capacitor C2 and performs DC/DC conversion of power supply voltage Vi and second DC voltage V2.

In second converter 21B, the power transmitted from second converter 21B to inverter 30 can also be bidirectionally adjusted by adjusting the phase difference in the same manner as in the first bridge. Control circuit 50 (FIG. 1) therefore can generate control signal Scb (FIG. 1) of switching elements Q1b to Q8b such that the phase difference is adjusted based on the difference between a detection value of second DC voltage V2 and second voltage command value V2*.

In this way, control circuit 50 can individually control first DC voltage V1 and second DC voltage V2 in accordance with first voltage command value V1* and second voltage command value V2* through individual control of first converter 21A and second converter 21B. Further, in each of first converter 21A and second converter 21B having a DAB configuration, power can be transmitted bidirectionally in the charging direction and the discharging direction of DC power source 10.

Inverter 31 includes switching elements Q10 to Q13 and diodes D10 and D11 to constitute a first leg, and switching elements Q20 to Q23 and diodes D20 and D21 to constitute a second leg, and reactors Lac1 and Lac2 and capacitors Cac1 and Cac2 to constitute LC filters.

In inverter 31, first terminal P1 is connected to power line DL1, second terminal P2 is connected to power line DL2, and third terminal P3 is connected to power line DL3. Power line DL2 (second terminal P2) connected to the low voltage side of first capacitor C1 and the high voltage side of second capacitor C2 is connected to a ground line GL that supplies a ground potential. That is, on the DC side of inverter 31, first capacitor C1 and second capacitor C2 are connected in series, and a ground potential is supplied to a neutral point corresponding to the connection point of first capacitor C1 and second capacitor C2.

Each of the first leg and the second leg has a circuit configuration of one phase of a three-level inverter. An AC output end Na1 of the first leg is connected to a power line ACL1 through reactor Lac1. One of +V1, ground potential (0 (V)), and −V2 is transmitted to AC output end Na1 from power lines DL1 to DL3.

Similarly, an AC output end Na2 of the second leg is connected to a power line ACL2 through reactor Lac2. One of +V1, ground potential (0 (V)), and −V2 is transmitted to AC output end Na1 from power lines DL1 to DL3.

Power system 40 has single-phase three-line AC power sources 41 and 42. AC power source 41 is connected between power line ACL1 and ground line GL. Capacitor Cac1 and reactor Lac1 connected in parallel to AC power source 41 constitute an LC filter of AC power source 41.

AC power source 42 is connected between power line ACL2 and ground line GL. Capacitor Cac2 and reactor Lac2 connected in parallel to AC power source 42 constitute an LC filter of AC power source 41.

In inverter 31, the on/off of switching elements Q10 to Q13 of the first leg is controlled such that the AC voltage (amplitude, frequency, phase) output to power line ACL1 matches the AC voltage (amplitude, frequency, phase) of AC power source 41. Similarly, the on/off of switching elements Q20 to Q23 of the second leg is controlled such that the AC voltage (amplitude, frequency, phase) output to power line ACL2 matches the AC voltage (amplitude, frequency, phase) of AC power source 42. That is, control circuit 50 generates control signal Sinv (FIG. 1) of switching elements Q10 to Q13 and Q20 to Q23 of inverter 31 so as to interconnect to the single-phase three-line power system 40.

An extreme example in which voltage unbalance between first capacitor C1 and second capacitor C2 is likely to occur is connection of a half-wave rectification load during isolated operation using inverter 31 for a single-phase three-line system.

When a half-wave rectification load is connected to inverter 31 during isolated operation, current flows with application of one of voltage polarities (positive or negative) with respect to the potential at the second terminal, and current does not flow with application of the other voltage polarity (negative or positive). Accordingly, the average value of current flowing between second terminal P2 and inverter 31 does not become zero and energy of only one of first capacitor C1 and second capacitor C2 may be consumed. In this case, if first converter 21A and second converter 21B have the same output power, voltage unbalance occurs between first capacitor C1 and second capacitor C2.

In power conversion device 110 according to the first embodiment, first converter 21A and second converter 21B also individually control first DC voltage V1 and second DC voltage V2. Thus, even when more power is taken out from one of first capacitor C1 and second capacitor C2 by inverter 30, the resulting reduction of first DC voltage V1 or second DC voltage V2 is detected by control circuit 50, and then first converter 21A or second converter 21B is controlled such that the reduced DC voltage is returned to first voltage command value V1* or second voltage command value V2*. As a result, the voltage unbalance between first capacitor C1 and second capacitor C2 can be suppressed.

Figure 3:
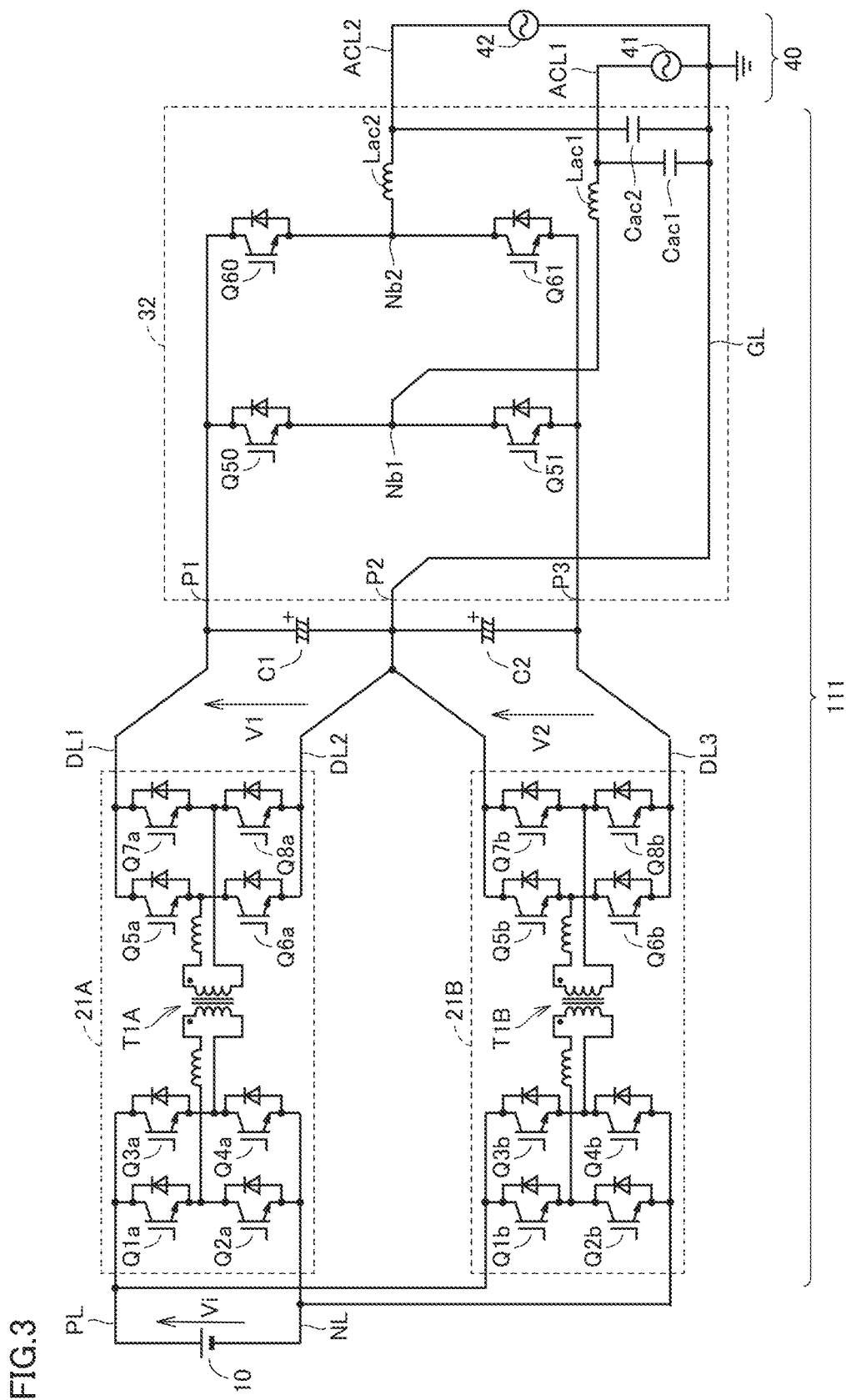
FIG. 3 is a circuit diagram illustrating a configuration of a power conversion device according to a second example of the first embodiment.

FIG. 3 is a circuit diagram illustrating a configuration of a power conversion device 111 according to a second example of the first embodiment.

Referring to FIG. 3, power conversion device 111 differs from power conversion device 110 illustrated in FIG. 2 in that it includes an inverter 32 instead of inverter 31. First converter 21A and second converter 21B are similar to those in FIG. 2 and will not be further elaborated.

Inverter 32 includes switching elements Q50 and Q51 to constitute a first leg and switching elements Q60 and Q61 to constitute a second leg. In inverter 32 also, first terminal P1 is connected to power line DL1, second terminal P2 is connected to power line DL2, and third terminal P3 is connected to power line DL3. On the DC side of inverter 32, first capacitor C1 and second capacitor C2 are connected in series, and a ground potential is supplied to a neutral point corresponding to the connection point of first capacitor C1 and second capacitor C2.

Each of the first leg and the second leg has a circuit configuration of a two-level inverter. An AC output end Nb1 of the first leg is connected to power line ACL1 through reactor Lac1. One of +V1 and −V2 is transmitted to AC output end Nb1 from power line DL1 or DL3. Similarly, an AC output end Na2 of the second leg is connected to power line ACL2 through reactor Lac2. One of +V1 and −V2 is transmitted to AC output end Nb1 from power line DL1 or DL3. In inverter 32, power line DL2 (second terminal P2) is not connected to the first leg and the second leg.

Power system 40 has single-phase three-line AC power sources 41 and 42, in the same manner as in FIG. 2. That is, LC filters similar to those in FIG. 2 are connected to AC power sources 41 and 42.

In inverter 32, the on/off of switching elements Q50 and Q51 of the first leg is controlled such that the AC voltage (amplitude, frequency, phase) output to power line ACL1 matches the AC voltage (amplitude, frequency, phase) of AC power source 41. Similarly, the on/off of switching elements Q60 and Q61 of the second leg is controlled such that the AC voltage (amplitude, frequency, phase) output to power line ACL2 matches the AC voltage (amplitude, frequency, phase) of AC power source 42. That is, control circuit 50 generates control signal Sinv (FIG. 1) of switching elements Q50, Q51, Q61, and Q62 of inverter 32 so as to interconnect to the single-phase three-line power system 40.

In power conversion device 111 in which a two-level inverter (inverter 32) is used as inverter 30 in FIG. 1, first converter 21A and second converter 21B also individually control first DC voltage V1 and second DC voltage V2, in the same manner as power conversion device 110 in FIG. 2. Therefore, even when voltage unbalance occurs between first capacitor C1 and second capacitor C2, for example, during isolated operation, first DC voltage V1 and second DC voltage V2 are controlled by first converter 31A and second converter 31B in accordance with first voltage command value V1* and second voltage command value V2, thereby suppressing the voltage unbalance.

Figure 4:
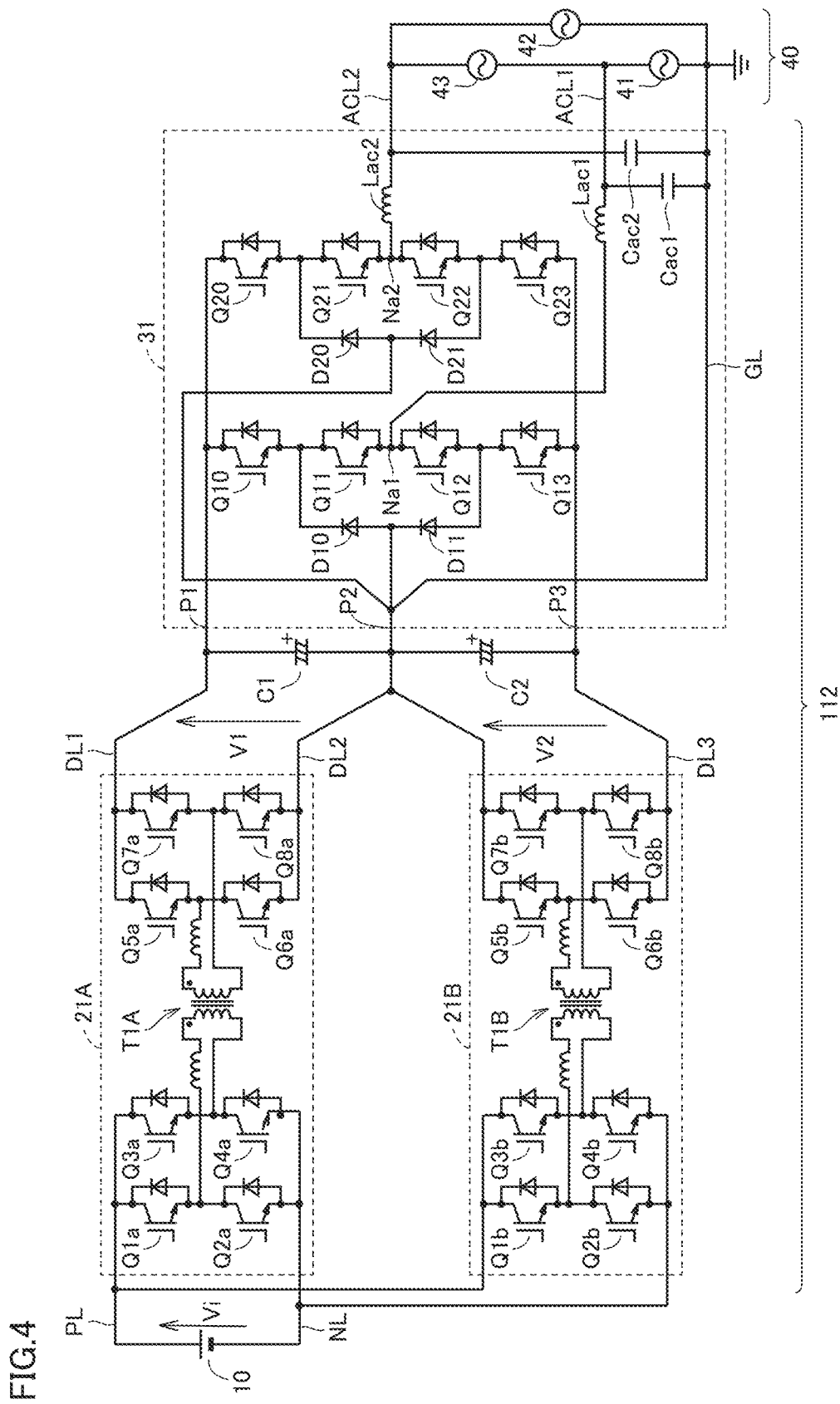
FIG. 4 is a circuit diagram illustrating a configuration of a power conversion device according to a third example of the first embodiment.

FIG. 4 is a circuit diagram illustrating a configuration of a power conversion device 112 according to a third example of the first embodiment.

Referring to FIG. 4, power conversion device 112 differs from power conversion device 110 illustrated in FIG. 2 in configuration of power system 40.

In FIG. 4, power system 40 has three-phase three-line AC power sources 41 to 43. AC power source 41 is connected between power line ACL1 and ground line GL. AC power source 42 is connected between power line ACL2 and ground line GL. AC power source 43 is connected between power line ACL1 and power line ACL2. A phase difference of 120° is provided between AC voltages of AC power sources 41 to 43.

First converter 21A and second converter 21B similar to those in FIG. 2 are arranged between first capacitor C1 and second capacitor C2, and DC power source 10. Further, inverter 31 similar to that in FIG. 2 is arranged between first converter 21A and second converter 21B, and ground line GL and power lines ACL1, ACL2. LC filters similar to those in FIG. 2 are provided for power lines ACL1, ACL2.

In the configuration in FIG. 4, in inverter 31, the on/off of switching elements Q10 to Q13 of the first leg and switching elements Q20 to Q23 of the second leg is controlled such that the AC voltage output to power line ACL1 and the AC voltage output to power line ACL2 have the same amplitude and the same frequency (specifically, corresponding to the nominal value of AC power sources 41 to 43) and the phase difference therebetween is 120°. That is, control circuit 50 generates control signal Sinv (FIG. 1) of switching elements Q10 to Q13 and Q20 to Q23 of inverter 31 so as to interconnect to three-phase three-line power system 40.

In inverter 31 for a three-phase three-line system, current of any one phase of three-phase AC power sources 41 to 43 flows through second terminal P2, that is, ground line GL. Accordingly, energies of first capacitor C1 and second capacitor C2 are alternately consumed every half cycle of the system cycle corresponding to the reciprocal of the frequency of AC voltage of AC power sources 41 to 43. In this case, if the output powers of first converter 21A and second converter 21B are equivalent, unbalance occurs in the positive and negative sides in a half cycle of the system cycle between first DC voltage V1 (first capacitor C1) and second DC voltage V2 (second capacitor C2).

For such voltage fluctuations, first converter 21A and second converter 21B can individually control first DC voltage V1 and second DC voltage V2 to suppress the voltage unbalance, in the same manner as power conversion device 110 in FIG. 2. Specifically, first DC voltage V1 and second DC voltage V2 are controlled in accordance with first voltage command value V1* and second voltage command value V2, whereby the respective output powers from first converter 31A and second converter 31B to first capacitor C1 and second capacitor C2 can be controlled so as to increase or decrease in accordance with change of power consumption from first capacitor C1 and second capacitor C2 in each half cycle described above.

As a result, even in the system interconnection with the three-phase three-line power system 40, the voltage unbalance between first capacitor C1 and second capacitor C2 connected in series to the DC side of inverter 31 through a neutral point can be suppressed.

Figure 5:
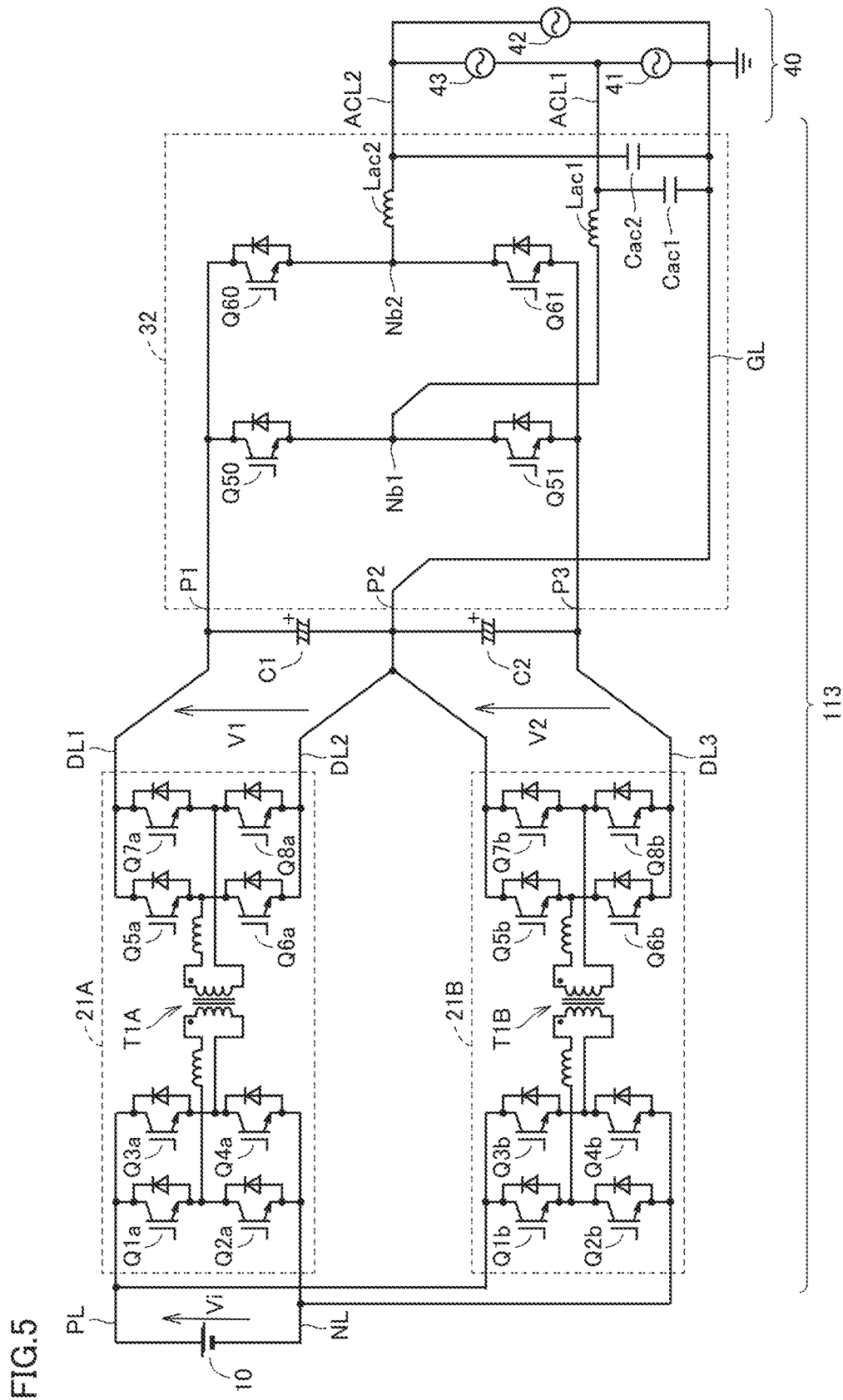
FIG. 5 is a circuit diagram illustrating a configuration of a power conversion device according to a fourth example of the first embodiment.

FIG. 5 is a circuit diagram illustrating a configuration of a power conversion device according to a fourth example of the first embodiment.

Referring to FIG. 5, a power conversion device 113 has a configuration in which three-phase three-line power system 40 similar to that of FIG. 4 is connected in power conversion device 111 illustrated in FIG. 3.

In power conversion device 113, AC voltages of power lines ACL1, ACL2 connected to AC power sources 41 to 43 are controlled by inverter 32 (two-level inverter) similar to that of FIG. 3. That is, control circuit 50 generates control signal Sinv (FIG. 1) of switching elements Q50, Q51, Q60, and Q61 of inverter 32 so as to interconnect to the three-phase three-line power system 40. For example, in inverter 32, the on/off of switching elements Q50 and Q51 of the first leg and switching elements Q60 and Q61 of the second leg is controlled such that the AC voltage output to power line ACL1 and the AC voltage output to power line ACL2 have the same amplitude and the same frequency (specifically, corresponding to the nominal value of AC power sources 41 to 43) and the phase difference therebetween is 120°, in the same manner as described in FIG. 4.

Even in power conversion device 113 in which a two-level inverter (inverter 32) is used as inverter 30 in FIG. 1 and a three-phase three-line power system is interconnected, first converter 21A and second converter 21B individually control first DC voltage V1 and second DC voltage V2. Accordingly, the voltage unbalance due to alternate consumption of energies of first capacitor C1 and second capacitor C2 can be handled in the same manner as described in FIG. 4. That is, first converter 21A and second converter 21B control first DC voltage V1 and second DC voltage V2 in accordance with first voltage command value V1* and second voltage command value V2 to suppress the voltage unbalance.

Figure 6:
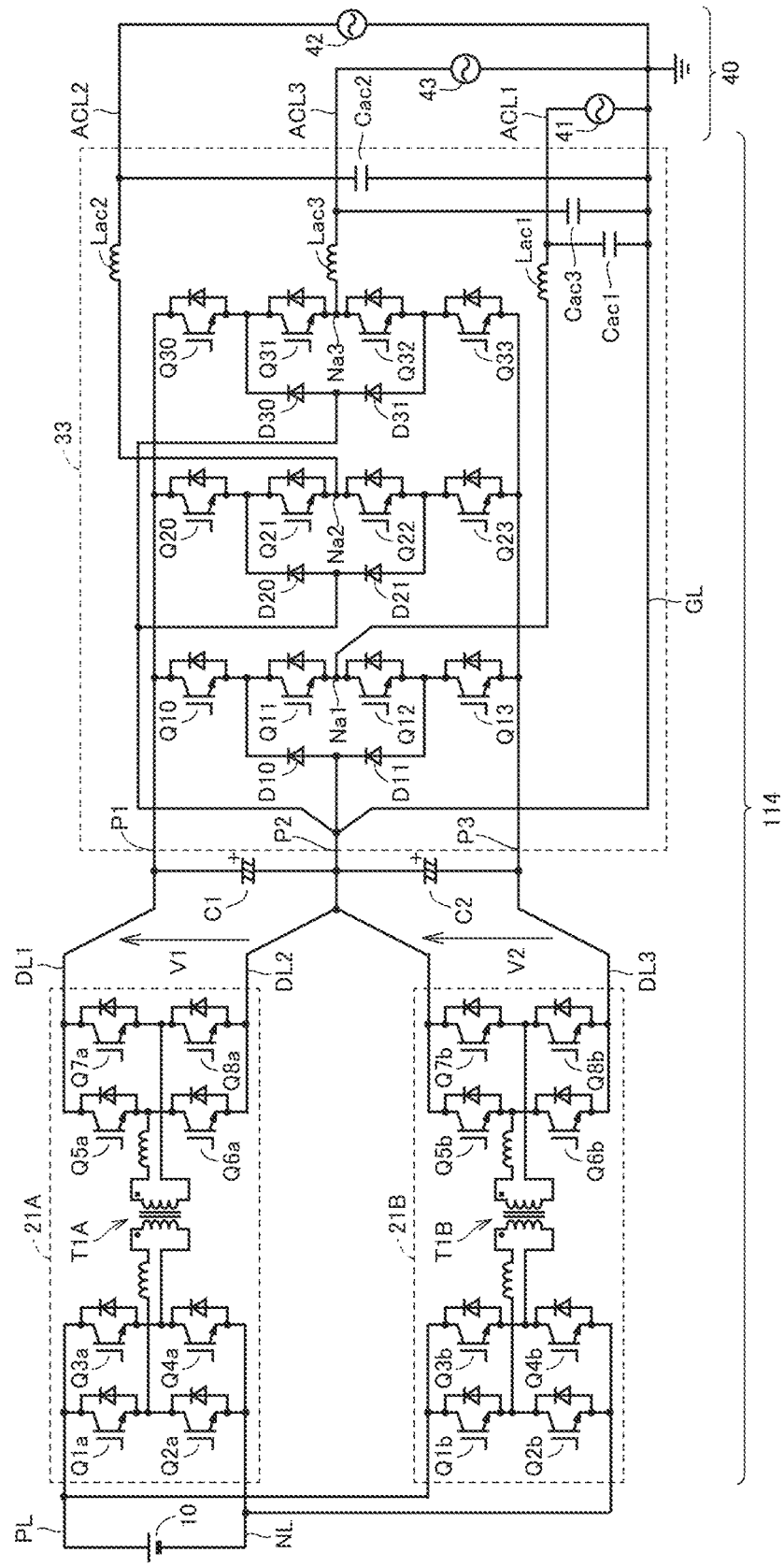
FIG. 6 is a circuit diagram illustrating a configuration of a power conversion device according to a fifth example of the first embodiment.

FIG. 6 is a circuit diagram illustrating a configuration of a power conversion device according to a fifth example of the first embodiment.

Referring to FIG. 6, a power conversion device 114 differs from power conversion device 112 illustrated in FIG. 4 in that it includes an inverter 33 instead of inverter 31 and power system 40 is composed of a three-phase four-line system.

The three-phase four-line power system 40 has AC power sources 41 to 43 respectively connected between three power lines ACL1 to ACL3 and ground line GL. In the configuration in FIG. 6, the grounding of power system 40 may be omitted as a configuration of grounding second terminal P2 on the DC side of inverter 33.

Inverter 33 further includes switching elements Q30 to Q33 and diodes D30 and D31 to constitute a third leg, in addition to switching elements Q10 to Q13 and diodes D10 and D11 (first leg) and switching elements Q20 to Q23 and diodes D20 and D21 (second leg) similar to those of inverter 31 in FIG. 4.

The third leg has a circuit configuration of one phase of the three-level inverter in the same manner as the first and second legs, and an AC output end Na3 of the third leg is connected to power line ACL3 through a reactor Lac3. One of +V1, ground potential (0 (V)), and −V2 is transmitted to AC output end Na3 from power lines DL1 to DL3. A capacitor Cac3 can be connected between power line ACL3 and ground line GL to provide AC power source 43 with an LC filter similar to those of AC power sources 41 and 42.

Control circuit 50 generates control signal Sinv (FIG. 1) of switching elements Q10 to Q13, Q20 to Q23, and Q30 to Q33 of inverter 33 so as to interconnect to the three-phase four-line power system 40. For example, AC voltages of AC power sources 41 to 43 are controlled to have the same amplitude and frequency and have a phase shift of 120°. Therefore, the on/off of switching elements Q10 to Q13, Q20 to Q23, and Q30 to Q33 is controlled such that the respective AC voltages output from the first to third legs to power lines ACL1 to ACL3 match the AC voltages (amplitude, frequency, phase) of AC power sources 41 to 43 described above.

In inverter 33 for a three-phase four-line system also, when a half-wave rectification load is connected during isolated operation, a period in which current flows and a period in which no current flows alternately appear in accordance with the voltage polarity (positive/negative) of the load, in the same manner as described in FIG. 2. Accordingly, the average value of current flowing between second terminal P2 and inverter 33 does not become zero, and energy may be consumed in only one of first capacitor C1 and second capacitor C2. In this case, if the output powers of first converter 21A and second converter 21B are equivalent, voltage unbalance occurs between first capacitor C1 and second capacitor C2.

In power conversion device 114 in FIG. 6, first converter 21A and second converter 21B also individually control first DC voltage V1 and second DC voltage V2. Thus, even when voltage unbalance occurs due to the phenomenon above, the resulting reduction of first DC voltage V1 or second DC voltage V2 is detected by control circuit 50, and then first converter 21A or second converter 21B is controlled such that the reduced DC voltage is returned to first voltage command value V1* or second voltage command value V2*. As a result, the voltage unbalance between first capacitor C1 and second capacitor C2 can be suppressed.

Figure 7:
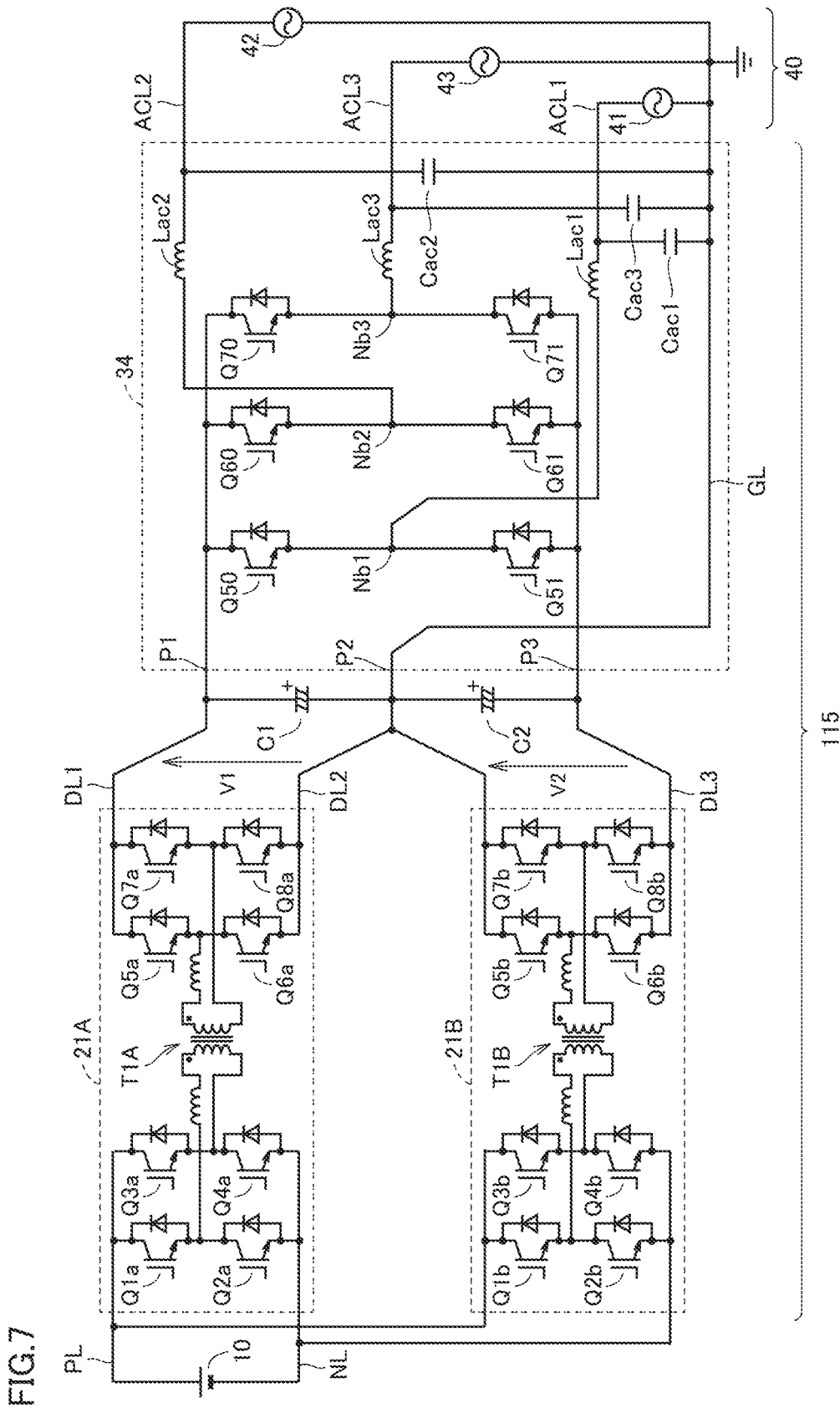
FIG. 7 is a circuit diagram illustrating a configuration of a power conversion device according to a sixth example of the first embodiment.

FIG. 7 is a circuit diagram illustrating a configuration of a power conversion device 115 according to a sixth example of the first embodiment.

Referring to FIG. 7, power conversion device 115 differs from power conversion device 113 illustrated in FIG. 5 in that it includes an inverter 34 instead of inverter 32 and power system 40 is composed of a three-phase four-line system. That is, power system 40 is similar to that of FIG. 6 and has AC power sources 41 to 43 respectively connected between three power lines ACL1 to ACL3 and ground line GL.

Inverter 34 further includes switching elements Q70 and Q71 to constitute a third leg, in addition to switching elements Q50 and Q51 (first leg) and switching elements Q60 and Q61 (second leg) similar to those of inverter 32 in FIG. 5.

The third leg has a circuit configuration of one phase of the two-level inverter in the same manner as the first and second legs, and an AC output end Nb3 of the third leg is connected to power line ACL3 through reactor Lac3. One of +V1 and −V2 is transmitted to AC output end Nb3 from power line DL1 or DL3. A capacitor Cac3 can be connected between power line ACL3 and ground line GL to provide AC power source 43 with an LC filter similar to those of AC power sources 41 and 42.

Control circuit 50 generates control signal Sinv (FIG. 1) of switching elements Q50, Q51, Q60, Q61, Q70, and Q71 of inverter 34 so as to interconnect to the three-phase four-line power system 40. For example, the on/off of switching elements Q50, Q51, Q60, Q61, Q70, and Q71 can be controlled such that AC voltages having a phase shift of 120° are output from the first to third legs to power lines ACL1 to ACL3, respectively, so as to match the AC voltages (amplitude, frequency, phase) of AC power sources 41 to 43, respectively, controlled as described in FIG. 6.

In power conversion device 115 in which inverter 34 (two-level inverter) is used for the three-phase four-line power system, first converter 21A and second converter 21B also individually control first DC voltage V1 and second DC voltage V2. Therefore, even when voltage unbalance between first capacitor C1 and second capacitor C2 occurs, the resulting reduction of first DC voltage V1 or second DC voltage V2 is detected by control circuit 50, and then first converter 21A or second converter 21B is controlled such that the reduced DC voltage is returned to first voltage command value V1* or second voltage command value V2*. As a result, the voltage unbalance between first capacitor C1 and second capacitor C2 can be suppressed.

As described above, in the power conversion device according to the first embodiment, first converter 21A and second converter 21B are arranged between DC power source 10, and first capacitor C1 and second capacitor C2 so that the first DC voltage (first capacitor C1) and the second DC voltage (second capacitor C2) can be individually controlled. Thus, even when voltage unbalance due to the operation of inverter 30 for interconnecting to power system 40 occurs between first capacitor C1 and second capacitor C2 connected in series to the DC side of inverter 30 (31 to 34) through a neutral point, first converter 21A and second converter 21B control first DC voltage V1 and second DC voltage V2 to suppress the voltage unbalance. Further, since a balance circuit is not provided unlike PTL 1, the voltage unbalance can be suppressed without involving power loss due to charging and discharging between first capacitor C1 and second capacitor C2.

As a result, in the power conversion device according to the first embodiment, in a configuration in which the voltages of capacitors (first capacitor C1 and second capacitor C2) divided at a neutral point are converted into an AC voltage by inverter 30 (31 to 34), the voltage unbalance between first capacitor C1 and second capacitor C2 can be suppressed without incurring complication of control and reduction of efficiency.

Further, the power exchanged between DC power source 10 and power system 40 can also be adjusted appropriately through the individual control of first DC voltage V1 and second DC voltage V2 by first converter 20A (21A) and second converter 20B (21B). In particular, first converter 21A and second converter 21B have a DAB configuration including a transformer so that DC power source 10 can be electrically insulated from power system 40 and power conversion can be performed bidirectionally in the charging direction and the discharging direction of DC power source 10.

In the balance circuit in PTL 1, two switching elements turn on and off complementarily with a dead time so that charging and discharging between a positive bus capacitor and a negative bus capacitor are repeated. Therefore, the capacitances of the positive bus capacitor and the negative bus capacitor or the inductance of the reactor in the balance circuit need to be ensured in order to reduce ripples of each capacitor voltage. This may lead to circuit size increase in the balance circuit in PTL 1. By comparison, in the power conversion device of the present embodiment, voltage fluctuations caused by ripples can be handled through the control of first converter 20A (21A) and second converter 20B (21B). Therefore, size reduction can be further achieved by reduction of capacitances of first capacitor C1 and second capacitor C2.

In the description of the first embodiment, the control of suppressing voltage unbalance between first capacitor C1 and second capacitor C2 by first converter 21A and second converter 21B is mainly described based on system interconnection. However, as mentioned above when appropriate, similar control can be applied similarly when a load independent of the power system is connected, that is, in isolated operation. As described above, when a half-wave rectification load is connected during isolated operation, unbalance tends to occur in power consumption from first capacitor C1 and second capacitor C2, but voltage unbalance between first capacitor C1 and second capacitor C2 can be suppressed through individual control of first DC voltage V1 and second DC voltage V2 described above.

Modification of First Embodiment

Figure 8:
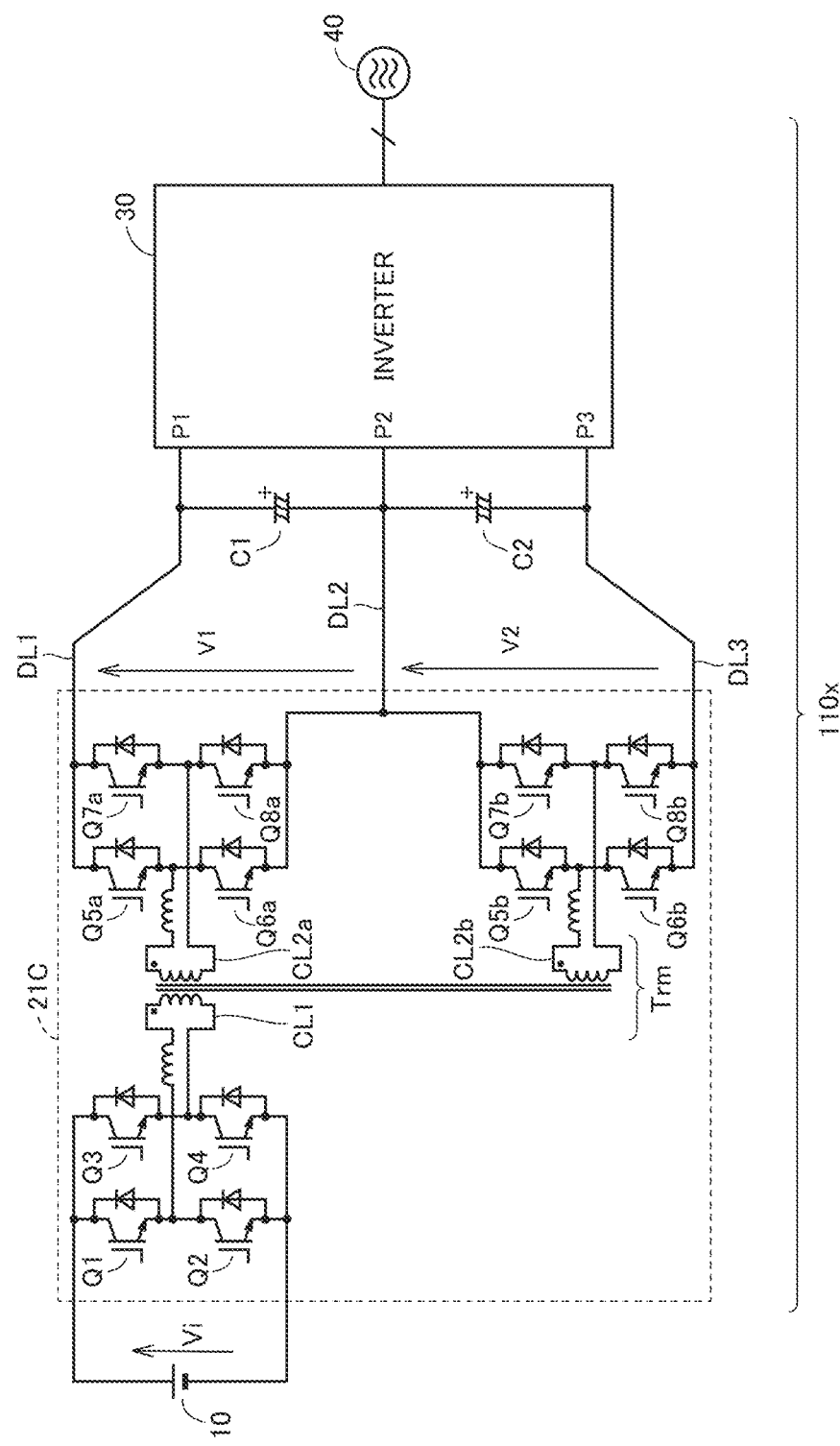
FIG. 8 is a circuit diagram illustrating a configuration of a power conversion device according to a modification of the first embodiment.

FIG. 8 is a circuit diagram illustrating a configuration of a power conversion device according to a modification of the first embodiment.

Referring to FIG. 8, a power conversion device 110x according to a modification of the first embodiment differs in that it includes a converter 21C instead of first converter 20A and second converter 20B illustrated in FIG. 1. As described later, in converter 21C, the transformer primary side of first converter 20A and second converter 20B in the first embodiment is integrally formed using a multi-winding transformer.

Converter 21C includes switching elements Q1 to Q4 to constitute a first bridge, a multi-winding transformer Trm, and switching elements Q5a to Q8a and Q5b to Q8b to constitute second bridges. Multi-winding transformer Trm has a primary winding CL1, a first secondary winding CL2a, and a second secondary winding CL2b wound around a common core. An AC voltage proportional to the AC voltage of primary winding CL1 is output to each of first secondary winding CL2a and second secondary winding CL2b.

The first bridge formed of switching elements Q1 to Q4 is connected between DC power source 10 and primary winding CL1 of multi-winding transformer Trm. Switching elements Q1 to Q4 are turned on/off in accordance with a control signal from control circuit 50 (FIG. 1) in the same manner as switching elements Q1a to Q4a or Q1b to Q4b in FIG. 2 and the like. Thus, the first bridge can convert power supply voltage Vi between DC buses PL and NL into an AC voltage and output the AC voltage to primary winding CL1.

The 1st second bridge formed of switching elements Q5a to Q8a is connected between first secondary winding CL2a and power lines DL1, DL2. The 2nd second bridge formed of switching elements Q5b to Q8b is connected between second secondary winding CL2b and power lines DL2, DL3. The connection relation between first capacitor C1 and second capacitor C2, and power lines DL1 to DL3 is similar to that of the first embodiment.

The on/off of switching elements Q5a to Q8a is controlled in accordance with a control signal from control circuit 50 (FIG. 1), in the same manner as in first converter 21A. Thus, switching elements Q5a to Q8a can convert the AC voltage transmitted to first secondary winding CL2a into first DC voltage V1 to be output to first capacitor C1 connected between power lines DL1 and DL2.

The on/off of switching elements Q5b to Q8b is controlled in accordance with a control signal from control circuit 50 (FIG. 1), in the same manner as in second converter 21B. Thus, switching elements Q5b to Q8b can convert the AC voltage transmitted to second secondary winding CL2b into second DC voltage V2 to be output to second capacitor C2 connected between power lines DL2 and DL3.

In converter 21C in FIG. 8 also, a first phase difference is provided between the on/off control signal of the switching elements in the common first bridge and the on/off control signal of the switching elements in the 1st second bridge (typically between switching elements Q1 and Q5a) and the first phase difference is changed, whereby the power transmitted from converter 21C to inverter 30 via first capacitor C1 can be adjusted bidirectionally.

Similarly, a second phase difference is provided between the on/off control signal of the switching elements in the common first bridge and the on/off control signal of the switching elements in the 2nd second bridge (typically between switching elements Q1 and Q5b) and the second phase difference is changed, whereby the power transmitted from converter 21C to inverter 30 via second capacitor C2 can be adjusted bidirectionally.

Control circuit 50 (FIG. 1) therefore can generate the on/off control signal of switching elements Q5a to Q8a such that the first phase difference is adjusted based on the difference between a detection value of first DC voltage V1 and first voltage command value V1*. Further, control circuit 50 can generate the on/off control signal of switching elements Q5b to Q8b such that the second phase difference is adjusted based on the difference between a detection value of second DC voltage V2 and second voltage command value V2*.

In this way, converter 21C in the modification of the first embodiment also can individually control first DC voltage V1 and second DC voltage V2 in accordance with first voltage command value V1* and second voltage command value V2*.

In power conversion device 110x according to the modification of the first embodiment, any of the single-phase three-line system, the three-phase three-line system, and the three-phase four-line system described with reference to FIG. 2 to FIG. 7 can be used as a configuration of power system 40. Any of inverters 31 to 34 described with reference to FIG. 2 to FIG. 7 can be used for inverter 30 to meet the configuration of power system 40.

As a result, in the power conversion device according to the modification of the first embodiment also, in a configuration in which the voltages of capacitors (first capacitor C1 and second capacitor C2) divided at a neutral point are converted into an AC voltage by inverter 30, first DC voltage V1 and second DC voltage V2 can be individually controlled by converter 21C with the multi-winding transformer having the common primary side.

With this configuration, the voltage unbalance between first capacitor C1 and second capacitor C2 can be suppressed without incurring complication of control and reduction of efficiency in the same manner as in the first embodiment, and in addition, the number of switching elements that constitute the converter can be reduced. Even in converter 21 having a DAB configuration including a transformer, DC power source 10 can be electrically insulated from power system 40 and power conversion can be performed bidirectionally in the charging direction and the discharging direction of DC power source 10. Even in the modification of the first embodiment, the voltage unbalance between first capacitor C1 and second capacitor C2 can be suppressed not only in system interconnection but also in isolated operation through similar control.

Second Embodiment

Figure 9:
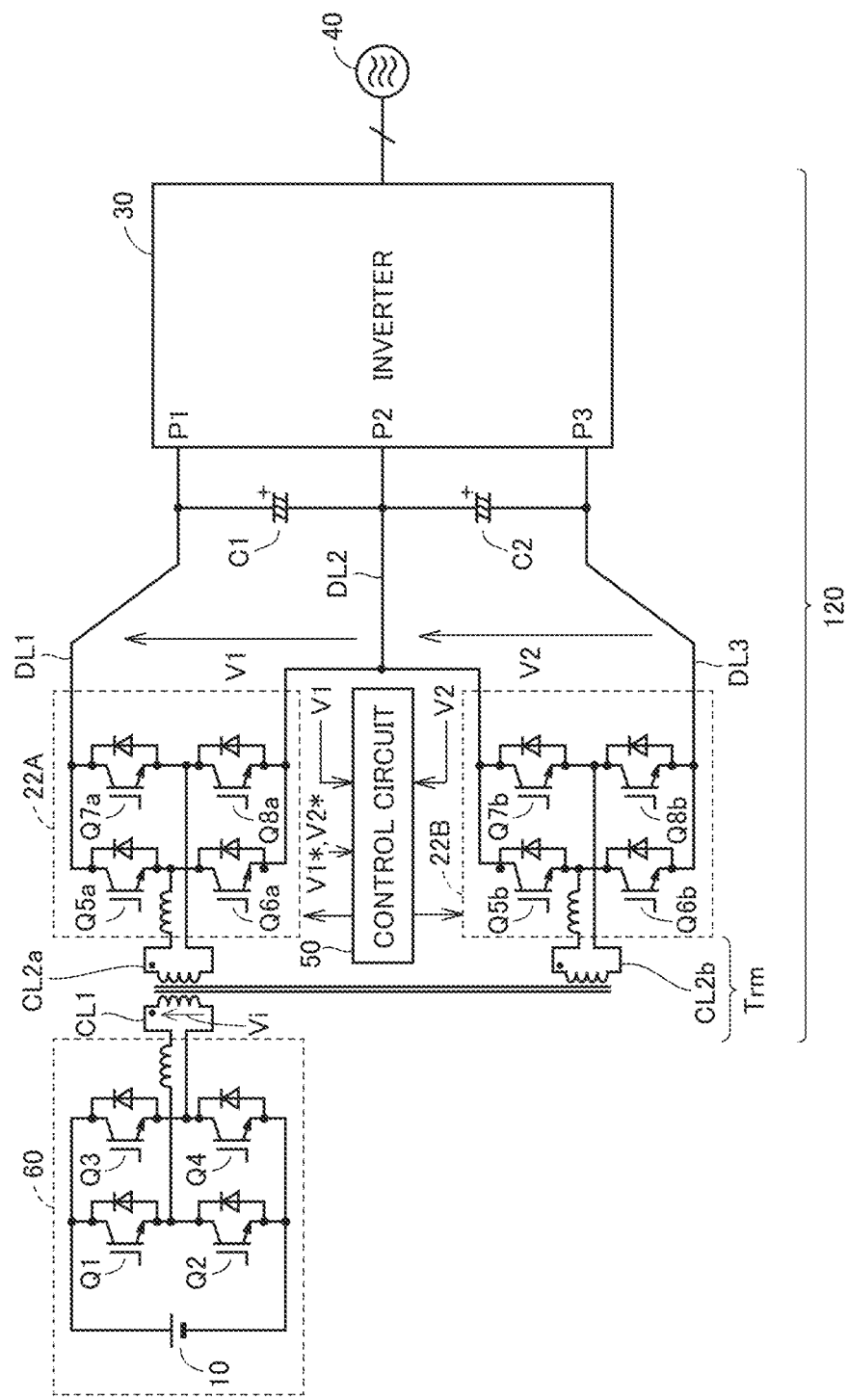
FIG. 9 is a circuit diagram illustrating a configuration of a power conversion device according to of a second embodiment.

FIG. 9 is a circuit diagram illustrating a configuration of a power conversion device according to a second embodiment.

Referring to FIG. 9, a power conversion device 120 according to the second embodiment includes a first converter 22A, a second converter 22B, a first capacitor C1, a second capacitor C2, an inverter 30, and a control circuit 50.

Power conversion device 120 performs power conversion between an AC power source 60 and power system 40. In the example in FIG. 9, with electrical insulation through multi-winding transformer Trm, power is transmitted from AC power source 60 to power system 40. Multi-winding transformer Trm has a primary winding CL1, a first secondary winding CL2a, and a second secondary winding CL2b, similar to those in FIG. 8.

For example, AC power source 60 includes a DC power source 10 and switching elements Q1 to Q4 to constitute a full bridge inverter. The full bridge circuit formed of switching elements Q1 to Q4 is connected between DC power source 10 and primary winding CL1 of multi-winding transformer Trm. AC power source 60 converts a DC voltage from DC power source 10 into an AC voltage by the full bridge inverter. The AC voltage is output as power supply voltage Vi (that is, "input voltage" of first converter 22A and second converter 22B) to primary winding CL1 of multi-winding transformer Trm. For example, AC power source 60 is composed of a high-frequency power source through magnetic coupling for use in wireless charging.

First converter 22A includes switching elements Q5a to Q8a to constitute a full bridge circuit connected between first secondary winding CL2a and power lines DL1, DL2. Similarly, second converter 22B includes switching elements Q5b to Q8b to constitute a full bridge circuit connected between second secondary winding CL2b and power lines DL2, DL3.

The connection relation between first capacitor C1 and second capacitor C2, and power lines DL1 to DL3 is similar to that of the first embodiment and will not be further elaborated.

The on/off of switching elements Q5a to Q8a is controlled in accordance with a control signal from control circuit 50. Thus, first converter 22A can convert the AC voltage transmitted to first secondary winding CL2a into first DC voltage V1 to be output to first capacitor C1 connected between power lines DL1 and DL2.

The on/off of switching elements Q5b to Q8b is controlled in accordance with a control signal from control circuit 50. Thus, second converter 22B can convert the AC voltage transmitted to second secondary winding CL2b into second DC voltage V2 to be output to second capacitor C2 connected between power lines DL2 and DL3.

First converter 22A can bidirectionally adjust the power transmitted from AC power source 60 (first secondary winding CL2a) to inverter 30 through first capacitor C1, in accordance with a known control method for full bridge circuits. Similarly, second converter 22B can also bidirectionally adjust the power transmitted from AC power source 60 (second secondary winding CL2b) to inverter 30 through second capacitor C2, in accordance with a known control method for full bridge circuits.

Control circuit 50 therefore can generate the on/off control signal of switching elements Q5a to Q8a that constitute first converter 22A, based on the difference between a detection value of first DC voltage V1 and first voltage command value V1*. Further, control circuit 50 can generate the on/off control signal of switching elements Q5b to Q8b that constitute second converter 22B, based on the difference between a detection value of second DC voltage V2 and second voltage command value V2*. As a result, in power conversion device 120 according to the second embodiment, first DC voltage V1 and second DC voltage V2 can also be individually controlled in accordance with first voltage command value V1* and second voltage command value V2*.

In power conversion device 120 according to the second embodiment also, any of the single-phase three-line system, the three-phase three-line system, and the three-phase four-line system described in the first embodiment (FIG. 2 to FIG. 7) can be used as a configuration of power system 40. Any of inverters 31 to 34 described in the first embodiment (FIG. 2 to FIG. 7) can be used for inverter 30 to meet the configuration of power system 40.

As a result, in power conversion device 120, even when an input voltage is an AC voltage, in a configuration in which the voltages of capacitors (first capacitor C1 and second capacitor C2) divided at a neutral point are converted into an AC voltage by inverter 30, first DC voltage V1 and second DC voltage V2 can be individually controlled by converter 21C with the multi-winding transformer having the common primary side.

With this configuration, the voltage unbalance between first capacitor C1 and second capacitor C2 can be suppressed without incurring complication of control and reduction of efficiency even in the second embodiment. Even in the second embodiment, the voltage unbalance between first capacitor C1 and second capacitor C2 can be suppressed not only in system interconnection but also in isolated operation through similar control. Further, in power conversion device 120 also, DC power source 10 is electrically insulated from power system 40 by multi-winding transformer Trm, and in first converter 22A and second converter 22B having a full bridge configuration, power conversion can be performed bidirectionally in the charging direction and the discharging direction of DC power source 10.

A specific configuration of first converter 20A (21A, 22A), second converter 20B (21B, 22B), and inverter 30 (31 to 34) is not limited to the examples in the first embodiment and the modification thereof and the second embodiment as long as it is practical. It should be noted that in each embodiment, any circuit configuration can be applied as long as power conversion (DC/DC conversion, AC/DC conversion, or DC/AC power conversion) similar to those of first converter 20A (21A, 22A), second converter 20B (21B, 22B), and inverter 30 (31 to 34) can be performed. For example, in the present embodiment, an insulation-type converter (first converters 21A, 22A, second converters 21B, 22B, and converter 21C) having a transformer (including multi-winding transformer) has been described as a configuration example of first converter 20A and second converter 20B. However, first converter 20A and second converter 20B may be configured with a non-insulation-type converter.

Embodiments disclosed here should be understood as being illustrative rather than being limitative in all respects. The technical scope of the present disclosure is shown not in the foregoing description but in the claims, and it is intended that all modifications that come within the meaning and range of equivalence to the claims are embraced here.

REFERENCE SIGNS LIST

10 DC power source, 20A to 22A, 31A first converter, 20B to 22B, 31B second converter, 21C converter, 30 to 34 inverter, 40 power system, 41 to 43, 60 AC power source, 50 control circuit, 100, 110, 110x, 111 to 115, 120 power conversion device, ACL1 to ACL3, DL1 to DL3 power line, C1 first capacitor, C2 second capacitor, CL1 primary winding, CL2a first secondary winding, CL2b second secondary winding, D10, D11, D20, D21, D30, D31 diode, GL ground line, Na1 to Na3, Nb1 to Nb3 AC output end, PL DC bus, Q1 to Q4, Q1a to Q8a, Q1b to Q8b, Q10 to Q13, Q20 to Q23, Q30 to Q33, Q50, Q51, Q60, Q61, Q62, Q70, Q71 semiconductor switching element, Sca, Scb, Sinv control signal, T1A, T1B transformer, Trm multi-winding transformer, V1 first DC voltage, V2 second DC voltage, Vi power supply voltage.

The invention claimed is:

1. A power conversion device comprising:
   a first capacitor and a second capacitor connected in series;
   a first converter to receive an input voltage based on a DC voltage from a DC power source and output a first DC voltage to the first capacitor;
   a second converter to receive the input voltage and output a second DC voltage to the second capacitor;
   a first inverter having a DC side connected to the first capacitor and the second capacitor and an AC side in which an AC voltage is generated using the first DC voltage and the second DC voltage on the DC side; and
   a control circuit to control operation of the first converter and the second converter,
   wherein the control circuit is configured to control the first converter such that the first DC voltage is controlled in accordance with a preset first voltage command value and control the second converter such that the second DC voltage is controlled in accordance with a second voltage command value set equivalent to the preset first voltage command value,
   wherein the control circuit is configured to individually control the first converter and the second converter respectfully in accordance with the first voltage command value and the second voltage command value, and
   the power conversion device does not include a balancing circuit at the output of the first converter and/or the second converter.

2. The power conversion device according to claim 1, wherein each of the first converter and the second converter includes:
   a transformer having a primary winding and a secondary winding,
   a plurality of switching elements to constitute a first bridge connected between the DC power source and the primary winding, and
   a plurality of switching elements to constitute a second bridge connected between the secondary winding and the first capacitor or the second capacitor.

3. The power conversion device according to claim 1, wherein
   the first converter and the second converter share:
      a multi-winding transformer having a primary winding and first and second secondary windings, and
      a plurality of switching elements to constitute a first bridge connected between the DC power source and the primary winding,
   the first converter further includes a plurality of switching elements to constitute a 1st second bridge connected between the first secondary winding and the first capacitor, and
   the second converter further includes a plurality of switching elements to constitute a 2nd second bridge connected between the second secondary winding and the second capacitor.

4. The power conversion device according to claim 1, wherein
   each of the first converter and the second converter is configured to receive an AC voltage from a second inverter, which converts the DC voltage from the DC power source into the AC voltage from the second inverter, as the input voltage,
   the first converter converts the AC voltage from the second inverter into the first DC voltage and outputs the first DC voltage to the first capacitor, and
   the second converter converts the AC voltage from the second inverter into the second DC voltage and outputs the second DC voltage to the second capacitor.

5. The power conversion device according to claim 4, further comprising a multi-winding transformer having a primary winding and first and second secondary windings, wherein
   an AC side of the second inverter is connected to the primary winding,
   the first converter includes a plurality of switching elements to constitute a bridge circuit connected between the first secondary winding and the first capacitor, and
   the second converter includes a plurality of switching elements to constitute a bridge circuit connected between the second secondary winding and the second capacitor.

6. The power conversion device according to claim 1, wherein the control circuit is configured to:
   control the first converter such that input power of the DC power source from the first capacitor and output power of the DC power source to the first capacitor are adjusted bidirectionally in a charging direction and a discharging direction of the DC power source, based on a difference between the first voltage command value and the first DC voltage, and
   control the second converter such that input power of the DC power source from the second capacitor and output power of the DC power source to the second capacitor are adjusted bidirectionally in the charging direction and the discharging direction of the DC power source, based on a difference between the second voltage command value and the second DC voltage.

7. The power conversion device according to claim 1, wherein
   the first converter outputs the first DC voltage across a first power line and a second power line, and
   the second converter outputs the second DC voltage across the second power line and a third power line.

8. The power conversion device according to claim 7, wherein
   the first power line is connected to a high voltage side of the first capacitor,
   the second power line is connected to a low voltage side of the first capacitor,
   the second power line is connected a high voltage side of the second capacitor, and
   the third power line is connected to a low voltage side of the second capacitor.

9. The power conversion device according to claim 8, wherein
   the DC side of the inverter includes a first terminal, a second terminal, and a third terminal,
   the high voltage side and the low voltage side of the first capacitor are respectively connected to the first terminal and the second terminal,
   the high voltage side and the low voltage side of the second capacitor are respectively connected to the second terminal and the third terminal, and
   the second terminal corresponds to a neutral point of the first capacitor and the second capacitor.

10. The power conversion device according to claim 1, wherein
    the DC side of the inverter includes a first terminal, a second terminal, and a third terminal,
    a high voltage side and a low voltage side of the first capacitor are respectively connected to the first terminal and the second terminal, a high voltage side and a low voltage side of the second capacitor are respectively connected to the second terminal and the third terminal, and the second terminal corresponds to a neutral point of the first capacitor and the second capacitor.

\* \* \* \* \*